United States Patent
Lin et al.

(10) Patent No.: US 10,462,061 B1
(45) Date of Patent: Oct. 29, 2019

(54) SYSTEMS AND METHODS FOR MANAGING QUALITY OF SERVICE

(71) Applicant: Veritas Technologies LLC, Mountain View, CA (US)

(72) Inventors: David Lin, San Jose, CA (US); Niranjan Pendharkar, Pune (IN); Prasanna Wakhare, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 217 days.

(21) Appl. No.: 15/472,197

(22) Filed: Mar. 28, 2017

(51) Int. Cl.
H04L 12/859 (2013.01)
H04L 29/08 (2006.01)
H04L 29/06 (2006.01)

(52) U.S. Cl.
CPC ...... *H04L 47/2475* (2013.01); *H04L 67/1097* (2013.01); *H04L 67/42* (2013.01)

(58) Field of Classification Search
None
See application file for complete search history.

(56) References Cited

U.S. PATENT DOCUMENTS 6,502,131 B1 * 12/2002 Vaid ...................... H04L 1/1854
709/224
9,807,639 B2 * 10/2017 Ideses ..................... H04W 28/02
2005/0144294 A1 * 6/2005 Gellens .................. H04W 76/10
709/228
2009/0125619 A1 * 5/2009 Antani ................... G06Q 10/00
709/223
2009/0245115 A1 * 10/2009 Krishnaswamy ... H04L 41/5025
370/242

(Continued)

FOREIGN PATENT DOCUMENTS

WO WO-2009062018 A3 * 6/2009 ............. H04L 45/00

OTHER PUBLICATIONS

Pendharkar, et al., "PIQOS: Practical Implementation of Storage Quality of Service in Hyper-Converged Environment", USENIX Fast 16.

(Continued)

*Primary Examiner* — Clayton R Williams
*Assistant Examiner* — Tania M Pena-Santana
(74) *Attorney, Agent, or Firm* — FisherBroyles, LLP

(57) ABSTRACT

The disclosed computer-implemented method for managing quality of service may include (i) providing, in a network storage environment, a quality of service engine to regulate network traffic by assigning three separate factors to applications that are consuming a network resource, (ii) adding, to a configuration of the quality of service engine, a fourth priority factor that establishes two tiers of priority among applications that generate traffic that is regulated by the quality of service engine, and (6) regulating, by the quality of service engine based on the fourth priority factor, network traffic in the network storage environment by providing access to the network resource to an application assigned a higher priority over another application assigned a lower priority such that the fourth priority factor enables the quality of service engine to adhere to a service level agreement. Various other methods, systems, and computer-readable media are also disclosed.

20 Claims, 4 Drawing Sheets

(56) References Cited

U.S. PATENT DOCUMENTS

2012/0236716 A1* 9/2012 Anbazhagan ....... H04L 41/5022
   370/235
2015/0117199 A1* 4/2015 Chinnaiah Sankaran ...................
   H04L 47/2433
   370/235

OTHER PUBLICATIONS

Wheeler, "Demystifying Cloud Service Provider Quality of Service", https://www.solidfire.com/blog/demystifying-cloud-service-provider-quality-of-service/.

* cited by examiner

SYSTEMS AND METHODS FOR MANAGING QUALITY OF SERVICE

BACKGROUND

Some quality of service designs that are commonly used in storage systems may apply certain attributes to an application to control the application's access to underlying storage. While the application of these traditional attributes may have been sufficient in the past for slower storage systems, these attributes alone cannot provide guaranteed performance levels to applications in some faster storage systems today. For example, in some scenarios a network storage environment may suffer from problems associated with over-subscription and/or overloading, as discussed further below. More specifically, in these scenarios, the network storage environment may fail to satisfy a service level agreement because too many applications are requesting consumption of underlying network resources. These problems become even more important as applications are moved to the cloud. In a cloud deployment scenario, multiple applications may share a common storage system, which may increase the risk of over-subscription and/or overloading problems. It is important, therefore, to apply a quality of service design that can ensure and enforce a service level agreement so that that applications can function properly. The instant disclosure, therefore, identifies and addresses a need for improved systems and methods for managing quality of service.

SUMMARY

As will be described in greater detail below, the instant disclosure describes various systems and methods for managing quality of service. In one example, a computer-implemented method for managing quality of service may include (i) providing, in a network storage environment, a quality of service engine to regulate network traffic by assigning three separate factors to applications that are consuming a network resource: (a) a reservation value, (b) a limit value, and (c) a weight value, (ii) adding, to a configuration of the quality of service engine, a fourth priority factor that establishes two tiers of priority among applications that generate traffic that is regulated by the quality of service engine, and (iii) regulating, by the quality of service engine based on the fourth priority factor, network traffic in the network storage environment by providing access to the network resource to an application assigned a higher priority over another application assigned a lower priority such that the fourth priority factor enables the quality of service engine to adhere to a service level agreement.

In one embodiment, the two tiers of priority include a higher priority queue of north-south local user application traffic and a lower priority queue of east-west inter-server data center network traffic as distinct from the local user application traffic. In one embodiment, the two tiers of priority include a higher priority queue for applications that are categorized as mission critical in terms of the service level agreement and a lower priority queue for applications that are categorized as mission non-critical in terms of the service level agreement. In one embodiment, the lower priority designates replication traffic for replicating data that was originally generated by applications that are assigned the higher priority.

In one embodiment, the network resource corresponds to: (i) storage in the network storage environment, (ii) central processing unit utilization, and/or (iii) input/output operations per second. In one embodiment, the weight value is defined in terms of an integer and the relative proportion of the network resource provided to the application, after satisfying the reservation value, is defined in terms of the integer divided by a totality of weight values that include the weight value and at least one other weight value.

In one embodiment, the reservation value reserves an amount of the network resource for the application, the limit value limits usage of the network resource by the application to the limit value, and the weight value defines a relative proportion of the network resource that will be provided to the application in comparison to a competing application after satisfying the reservation value. In one embodiment, the three separate factors of the reservation value, the limit value, and the weight value, prior to adding the fourth priority factor, ensure an equitable sharing of the network resource but create a potential failure to adhere to the service level agreement. Additionally, in this embodiment, the adding of the fourth priority factor to the configuration of the quality of service engine effectively prevents the potential failure and guarantees satisfaction of the service level agreement.

In one embodiment, the computer-implemented method may further include providing, after satisfying a set of applications that were assigned the higher priority, access to a remainder of the network resource to applications that were assigned the lower priority according to the respective weight value. In one embodiment, access is provided to the remainder of the network resource to applications that were assigned the lower priority according to a round robin algorithm.

In one embodiment, a system for implementing the above-described method may include (i) a provisioning module, stored in memory, that provides, in a network storage environment, a quality of service engine to regulate network traffic by assigning three separate factors to applications that are consuming a network resource: (a) a reservation value, (b) a limit value, and (c) a weight value, (ii) an adding module, stored in memory, that adds, to a configuration of the quality of service engine, a fourth priority factor that establishes two tiers of priority among applications that generate traffic that is regulated by the quality of service engine, (iii) a regulation module, stored in memory, that regulates, as part of the quality of service engine and based on the fourth priority factor, network traffic in the network storage environment by providing access to the network resource to an application assigned a higher priority over another application assigned a lower priority such that the fourth priority factor enables the quality of service engine to adhere to a service level agreement, and (iv) at least one physical processor configured to execute the provisioning module, the adding module, and the regulation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) provide, in a network storage environment, a quality of service engine to regulate network traffic by assigning three separate factors to applications that are consuming a network resource: (a) a reservation value, (b) a limit value, and (c) a weight value, (ii) add, to a configuration of the quality of service engine, a fourth priority factor that establishes two tiers of priority among applications that generate traffic that is regulated by the quality of service engine, and (iii) regulate, by the quality of service engine based on the fourth priority factor, network traffic in the network storage environment by providing access to the network resource to an application assigned a higher priority over another application assigned a lower priority such that the fourth priority factor enables the quality of service engine to adhere to a service level agreement.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
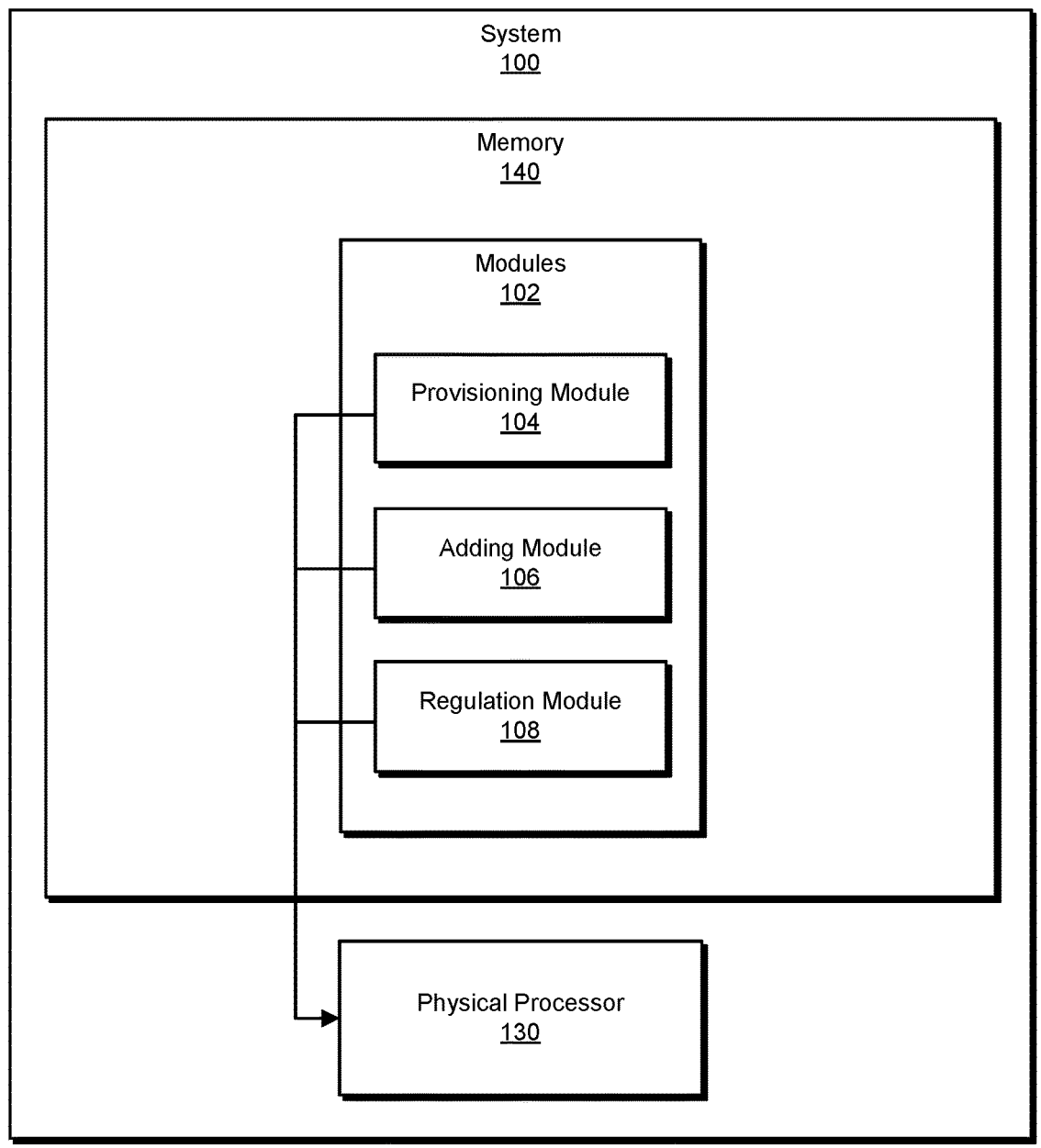
FIG. 1 is a block diagram of an example system for managing quality of service.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing quality of service. As discussed further below, the disclosed systems and methods may solve problems associated with related quality of service engines. Specifically, the disclosed systems and methods may solve problems associated with over-subscription and/or overloading of network resources. The disclosed systems and methods may solve these problems by assigning a fourth factor to applications managed by the quality of service engine. This fourth factor may correspond to a priority factor that indicates whether the application's network traffic belongs on a higher priority track or a lower priority track. The higher priority track may provide applications on that track with first access to one or more requested network resources. After the requests of applications on the higher priority track are satisfied, then the remaining applications on the lower priority track may receive access to a remainder of the network resources, as discussed further below.

Figure 2:
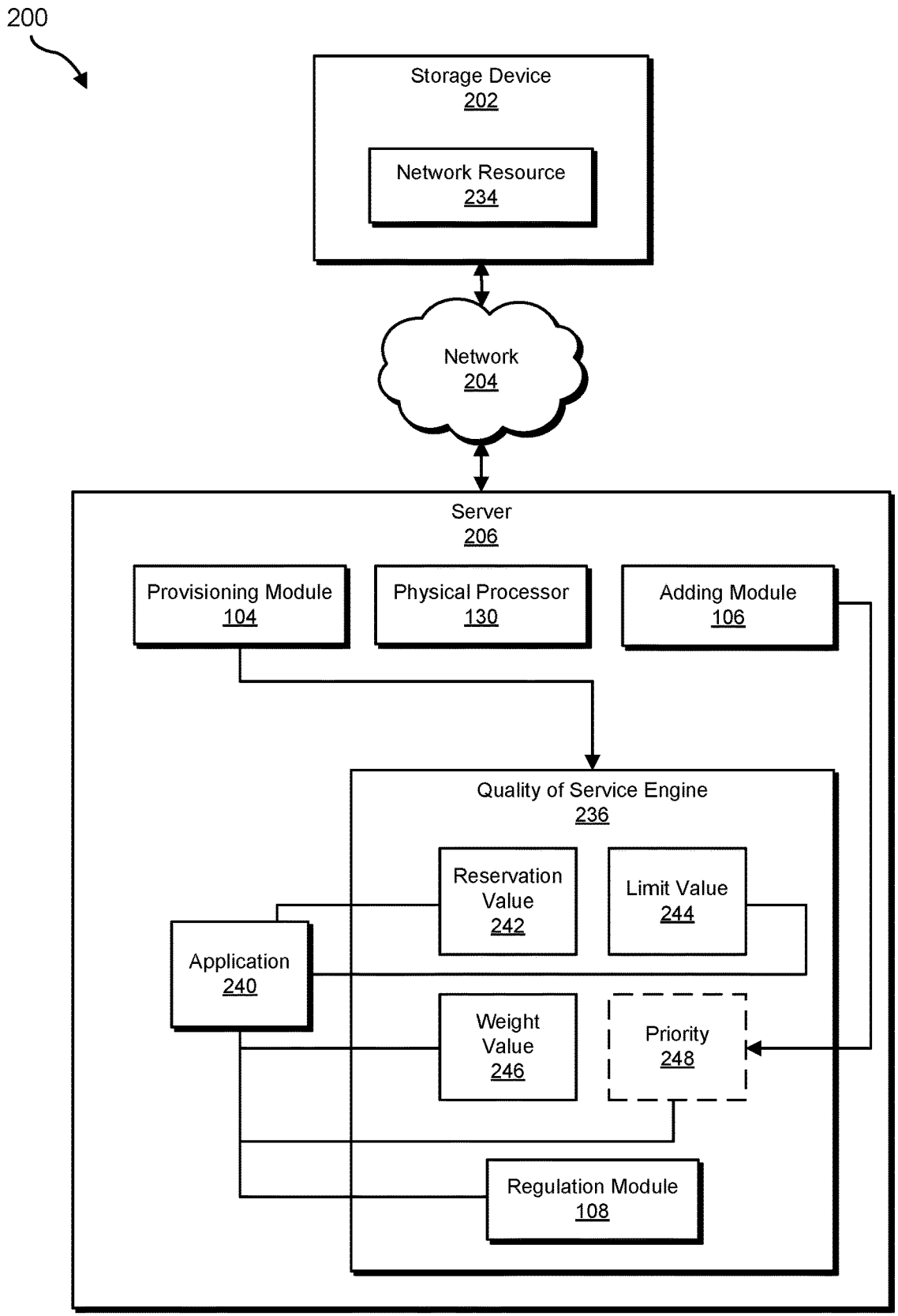
FIG. 2 is a block diagram of an additional example system for managing quality of service.

The following will provide, with reference to FIGS. 1-2, detailed descriptions of example systems for managing quality of service. Detailed descriptions of corresponding computer-implemented methods will also be provided in connection with FIGS. 3-4.

FIG. 1 is a block diagram of example system 100 for managing quality of service. As illustrated in this figure, example system 100 may include one or more modules 102 for performing one or more tasks. For example, and as will be explained in greater detail below, example system 100 may include a provisioning module 104 that provides, in a network storage environment, a quality of service engine to regulate network traffic by assigning three separate factors to applications that are consuming a network resource. These factors may include a reservation value, a limit value, and a weight value. Example system 100 may additionally include an adding module 106 that adds, to a configuration of the quality of service engine, a fourth priority factor that establishes two tiers of priority among applications that generate traffic that is regulated by the quality of service engine. Example system 100 may also include a regulation module 108 that regulates, as part of the quality of service engine and based on the fourth priority factor, network traffic in the network storage environment by providing access to the network resource to an application assigned a higher priority over another application assigned a lower priority such that the fourth priority factor enables the quality of service engine to adhere to a service level agreement. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., storage device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing quality of service. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a storage device 202 in communication with a server 206 via a network 204. In one example, all or a portion of the functionality of modules 102 may be performed by storage device 202, server 206, and/or any other suitable computing system. As will be described in greater detail below, one or more of modules 102 from FIG. 1 may, when executed by at least one processor of storage device 202 and/or server 206, enable storage device 202 and/or server 206 to manage quality of service.

For example, provisioning module 104 may provide, in a network storage environment (which may correspond to network 204), a quality of service engine 236 to regulate network traffic by assigning three separate factors to applications, such as an application 240, that are consuming a network resource 234, which may be located at storage device 202. These factors may include a reservation value 242, a limit value, 244, and a weight value 246. Furthermore, adding module 106 may add, to quality of service engine 236, a fourth priority factor (e.g., a priority 248) that establishes two tiers of priority among applications that generate traffic that is regulated by quality of service engine 236. Subsequently, regulation module 108 may regulate, as part of quality of service engine 236, and based on priority 248, network traffic in the network storage environment by providing access to network resource 234 to an application (e.g., application 240) assigned a higher priority over another application assigned a lower priority such that the fourth priority factor enables quality of service engine 236 to adhere to a service level agreement.

Storage device 202 generally represents any type or form of computing device or storage device that may provide long-term storage in a network computing environment. In one example embodiment, storage device 202 may provide a shared storage for usage by a multitude of guest virtual machines that are managed by at least one hypervisor. In some examples, storage device 202 may correspond to tape storage, network storage, a storage array, storage of a storage area network, software-defined storage, virtualized storage, cloud storage, and/or deduplication storage. In some examples, storage device 202 may constitute part of a larger computing device, which may correspond to one or more laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Server 206 generally represents any type or form of computing device that is capable of performing or facilitating method 300, as discussed further below. In one embodiment, server 206 may correspond to a quality of service server that includes quality of service engine 236 and thereby regulates network traffic to achieve a specified quality of service, such as a quality of service defined in terms of a service level agreement. Notably, in the example of FIG. 2, application 240 is located on the same server 206 as quality of service engine 236 for the purpose of simplicity in the drawings. Nevertheless, in other examples, application 240 may generally be located on a different server than the server where the quality of service engine is located. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between storage device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
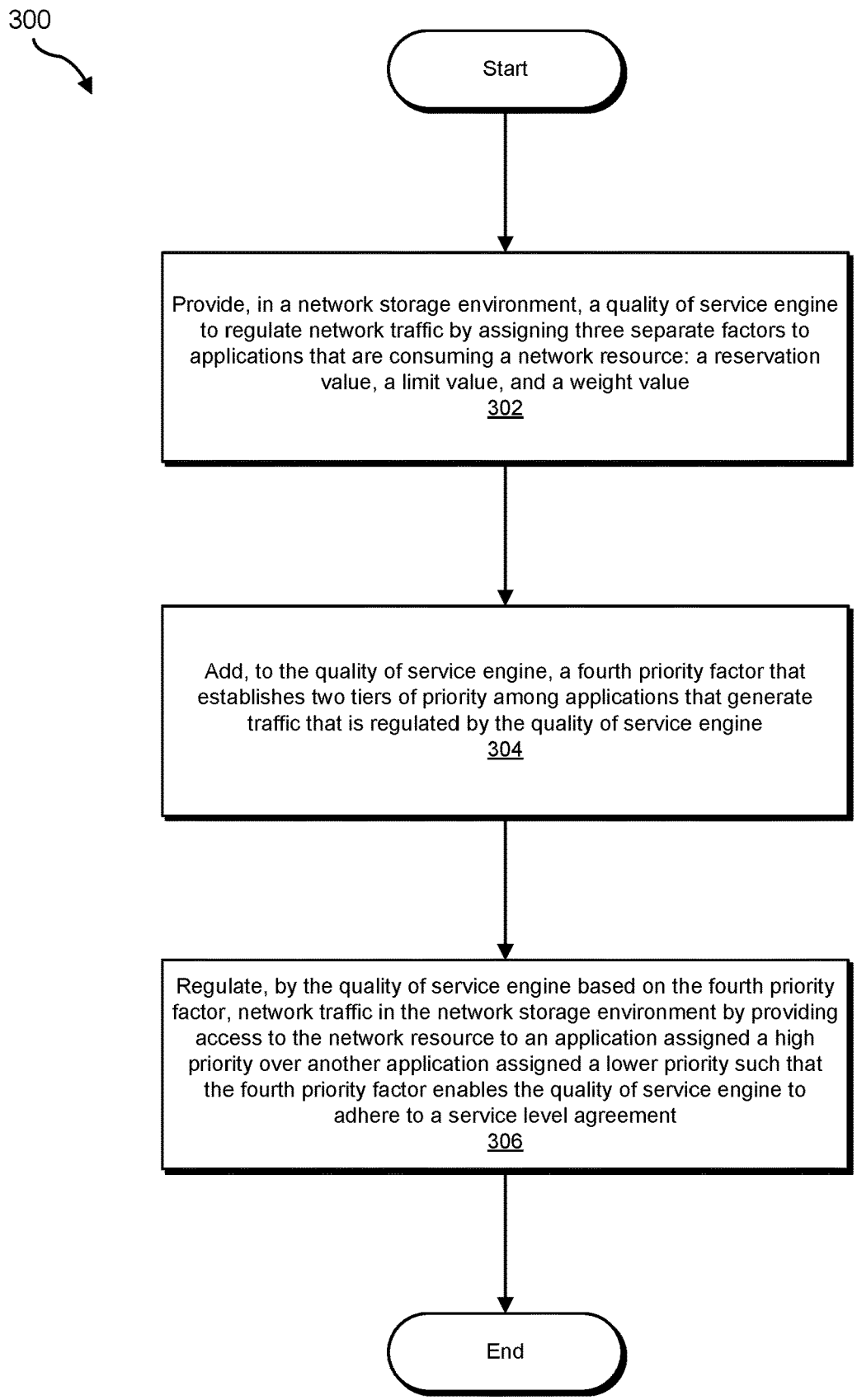
FIG. 3 is a flow diagram of an example method for managing quality of service.

FIG. 3 is a flow diagram of an example computer-implemented method 300 for managing quality of service. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may provide, in a network storage environment, a quality of service engine to regulate network traffic by assigning three separate factors to applications that are consuming a network resource. For example, provisioning module 104 may, as part of server 206 in FIG. 2, provide, in a network storage environment that corresponds to network 204, quality of service engine 236 to regulate network traffic by assigning three separate factors, which may correspond to reservation value 242, limit value 244, and weight value 246, to applications that are consuming network resource 234.

As used herein, the term "quality of service engine" or controller generally refers to an engine (e.g., in hardware, software, firmware, or a virtual resource) that attempts to provide a desired level of network or storage performance through traffic prioritization and/or resource reservation control mechanisms. In some examples, the quality of service engine may operate at a higher level of abstraction, according to a network model, than the original network traffic that is generated by the applications (e.g., TCP/IP network traffic). For example, applications may generate network traffic according to a basic network protocol, and the quality of service engine may thereafter modify, revise, manipulate, rearrange, and/or regulate the network traffic in an attempt to optimize network performance. In further examples, the quality of service engine may provide different priorities to different applications, users, network packets, and/or workflow, and the engine may guarantee a certain level of performance to a workflow. The quality of service engine may perform one or more of these operations in an attempt to satisfy a service level agreement or other specification of nominal or desired performance. Moreover, as used herein, the term "application" generally refers to a user application executing on an operating system, a user application operating on a guest virtual machine that is further executing on a hypervisor, and/or the guest virtual machine itself. Any one or more of these applications may generate network traffic and/or workflows that place demands or requests on corresponding network resources, as discussed further below.

Provisioning module 104 may provide the quality of service engine in a variety of ways. In general, provisioning module 104 may insert the quality of service engine at a node, or network location or address, that enables the quality of service engine to successfully regulate network traffic and resources. In some examples, provisioning module 104 may insert the quality of service engine at an intervening point or node between a source of network traffic and the intended destination of the network traffic.

In one embodiment, the reservation value reserves an amount of the network resource for the application, the limit value limits usage of the network resource by the application to the limit value, and/or the weight value defines a relative proportion of the network resource that will be provided to the application in comparison to a competing application after satisfying the reservation value. Additionally, in one embodiment, the weight value is defined in terms of an integer and the relative proportion of the network resource provided to the application, after satisfying the reservation value, is defined in terms of the integer divided by a totality of weight values that include the weight value and at least one other weight value.

Notably, in one embodiment the quality of service engine uses all three of these separate factors (e.g., the reservation value, the limit value, and the weight value). Nevertheless, in alternative embodiments, the quality of service engine may use only one or two of these factors, while still embellishing these factors with the fourth priority factor, as discussed further below.

In general, the network resource may correspond to any suitable computing or network resource that an application in a storage network environment may use to successfully store user data or application data, as discussed further below. In one embodiment, the network resource corresponds to storage in the network storage environment, central processing unit utilization, system memory utilization, and/or input/output operations per second. For example, the quality of service engine may assign a different level of input/output operations per second to one virtual machine of the storage network environment while assigning a different level of input/output operations per second to a different virtual machine that is executing on the same hypervisor. Notably, in some examples, the three separate factors of the reservation value, the limit value, and the weight value, prior to adding the fourth priority factor (which is discussed further below in connection with step 306) ensure an equitable sharing of network resource 234 but create a potential failure to adhere to the service level agreement.

Returning to FIG. 3, at step 304, one or more of the systems described herein may add, to a configuration of the quality of service engine, a fourth priority factor that establishes two tiers of priority among applications that generate traffic that is regulated by the quality of service engine. For example, adding module 106 may, as part of server 206 in FIG. 2, add, to the configuration of quality of service engine 236, a fourth priority factor, which corresponds to priority 248, that establishes two tiers of priority among applications, such as application 240, that generate traffic that is regulated by quality of service engine 236.

Adding module 106 may add the fourth priority factor to a configuration of the quality of service engine in a variety of ways. As used herein, the phrase "add, to a configuration of the quality of service engine, a fourth priority factor" generally refers to the modifying, creating, adjusting, establishing, and/or configuring the quality of service engine in a manner such that the quality of service engine does not just apply one or more of the three separate factors identified above (e.g., the reservation value, the limit value, and the weight value), but also considers the fourth priority factor, as discussed further below. In other words, adding the fourth priority factor will generally result in the quality of service engine assigning applications to either one of at least two different priority tracks, and the quality of service engine will regulate network traffic for the applications based on the assigned level of priority, in addition to one or more of the three original factors further described above.

In one embodiment, the two tiers of priority include a higher priority queue of north-south local user application traffic and a lower priority queue of east-west inter-server data center network traffic as distinct from the local user application traffic. As used herein, the term "north-south local user application traffic" generally refers to network traffic generated by a user or business application, as a client device, in communication with a destination server. Examples of north-south local user application traffic may correspond to uploading sales data to a data warehouse, an employer accessing or modifying data within a corporate network, and/or an academic researcher accessing a remote server farm to perform computation-intense data mining operations. In contrast, the term "east-west inter-server data center network traffic" generally refers to inter-server traffic at one or more data centers to move, migrate, preserve, copy, and/or protect data that has already been generated by a user application. In some examples, east-west inter-server data center network traffic may result from the migration of a virtual machine from one data center to another data center, or from one node of a data center to a different node of the same data center or a different data center. In other examples, east-west inter-server data center network traffic may correspond to network traffic for replicating data from one node of the data center to another node of the same or different data center. In other words, in one embodiment, the lower priority designates replication traffic for replicating data that was originally generated by applications that are assigned the higher priority by the quality of service engine.

Additionally, or alternatively, in one embodiment, the two tiers of priority may include a higher priority queue for applications that are categorized as mission critical, and a lower priority queue for applications that are categorized as mission non-critical. In some examples, the categorization of applications as either mission-critical, or mission non-critical, may be defined in terms of the service level agreement. For example, the service level agreement may specify a guaranteed level of performance for the mission-critical applications while not specifying any guaranteed level of performance for the mission non-critical applications.

Figure 4:
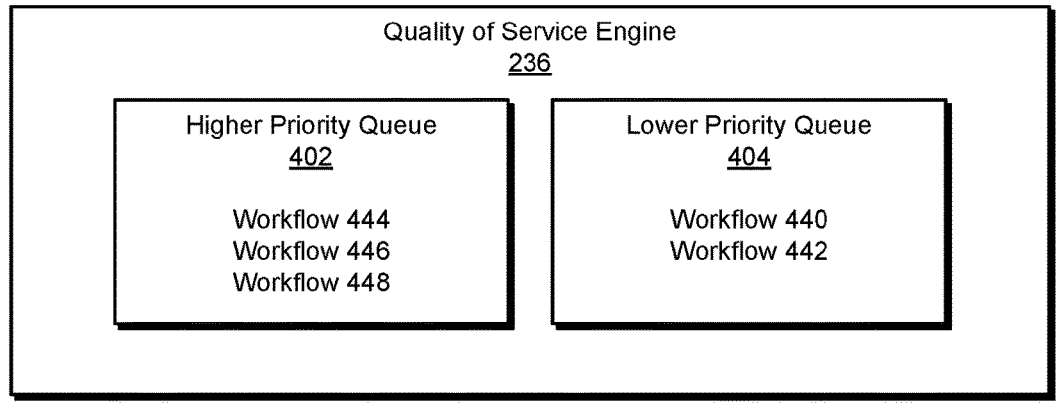
FIG. 4 is a block diagram that illustrates the operation of an example quality of service engine.
Figure 4:
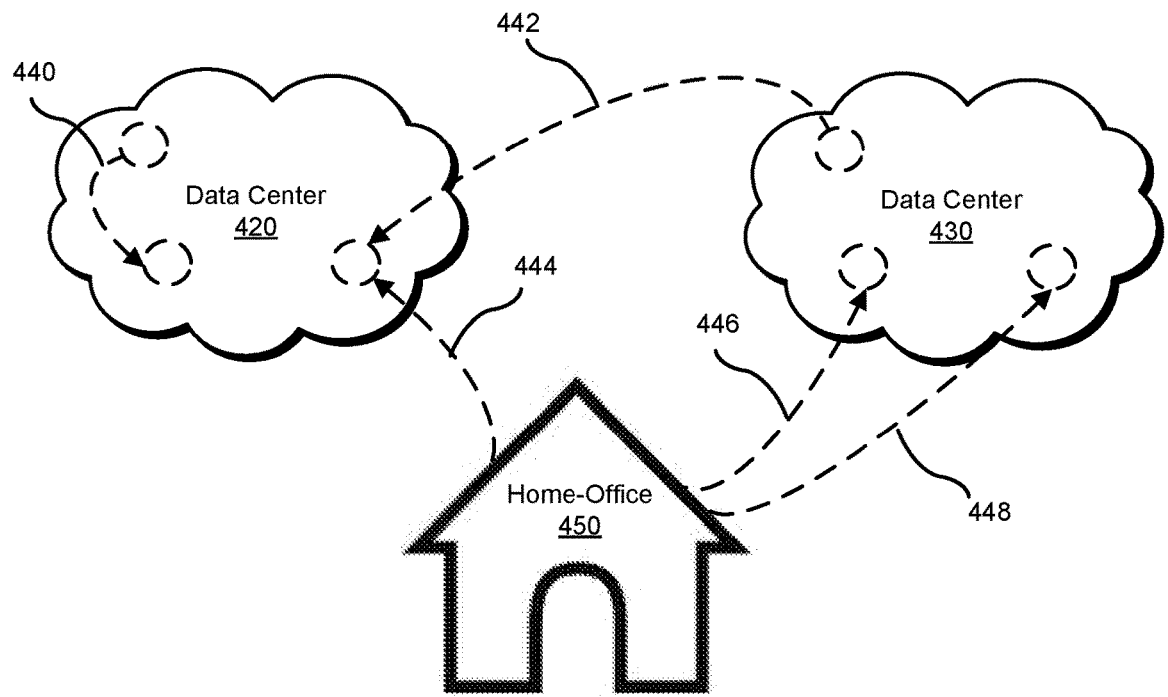

FIG. 4 illustrates an example of quality of service engine 236 and its operation according to method 300. In this example, a user or employee may access a user application from a home-office 450. The user application at home-office 450 may be configured to communicate with one or more data centers, such as a data center 420 and a data center 430. These data centers may provide cloud storage and cloud computing services (e.g., AMAZON S3 cloud services) for the benefit of the user application at home-office 450. Accordingly, in this example, the user working with the user application at home-office 450 may generate north-south client-server user application network traffic, such as a workflow 444, a workflow 446, and a workflow 448.

As further shown in this figure, these network workflows may target respective nodes or hosts within data center 420 and data center 430. In some examples, this north-south client-server user application network traffic may be higher priority (e.g., according to a service level agreement) in the sense that the user at home-office 450 expects the user application to respond nearly instantaneously. In other words, the north-south client-server user application network traffic may be higher priority, mission-critical, and/or time sensitive. Accordingly, quality of service engine 236 may categorize the north-south client-server user application network traffic as higher priority, within a higher priority queue 402, as shown in FIG. 4.

In contrast, the servers, hosts, and/or nodes within data center 420 and data center 430 may also generate east-west inter-server data center traffic, as distinct from north-south client-server user application network traffic. More specifically, in this example, data center 420 may generate a workflow 440 and data center 430 may generate a workflow 442. Workflow 440 may replicate data from one host or node within data center 420 to another host or node within the same data center. In contrast, workflow 442 may replicate data from one host or node within data center 430 to a distinct host or node within data center 420. Workflow 440 and workflow 442 may correspond to lower priority network traffic in the sense that the replication operations, or other data archiving, backup, protecting, redundancy, deduplication, migration, optimization, and/or dynamic pathing operations, may be less important, mission-critical, and/or time sensitive than north-south client-server user application network traffic. Accordingly, quality of service engine 236 may include workflow 440 and workflow 442 within a lower priority queue 404, as shown within FIG. 4.

In terms of a specific and arbitrary example, data center 420 may perform a weekly replication operation (e.g., workflow 440) to backup and archive one or more items of data. Nevertheless, it may be relatively unimportant whether the weekly replication operation is performed on a Tuesday, on a Wednesday, or on a Thursday, etc. The specific timing, each week, of the replication operation may be relatively unimportant so long as the replication operation is performed in a routine manner that reliably protects and archives the corresponding data. In contrast, when a user of the user application at home-office 450 enters a command that generates a request for data center 430, the user may expect a substantially instantaneous response, or at least expect the corresponding server at data center 430 to begin processing the request nearly instantaneously (e.g., to begin a data mining process or a mass scale storage process).

Returning to FIG. 3, at step 306, one or more of the systems described herein may regulate, by the quality of service engine based on the fourth priority factor, network traffic in the network storage environment by providing access to the network resource to an application assigned a higher priority over another application assigned a lower priority such that the fourth priority factor enables the quality of service engine to adhere to a service level agreement. For example, regulation module 108 may, as part of server 206 in FIG. 2, regulate, as part of the quality of service engine and based on the fourth priority factor, network traffic in the network storage environment by providing access to network resource 234 to an application, such as application 240, assigned a higher priority over another application assigned a lower priority such that the fourth priority factor enables the quality of service engine to adhere to a service level agreement (e.g., by ensuring that the higher priority application receives sufficient access to the network resource, in compliance with the service level agreement, even if one or more lower priority applications have one or more requests for access to the network resource denied or unsatisfied).

As used herein, the phrase "enables the quality of service engine to adhere to a service level agreement" generally refers to the quality of service engine switching from a state of being unable to adhere to the service level agreement to a state of adhering to a service level agreement. Additionally, as used herein, the term "service level agreement" generally refers to the conventional sense of a contract or agreement between a service provider and a user or customer that defines the level of service or performance that the customer expects from the service provider.

Regulation module 108 may regulate network traffic in a variety of ways. In some examples, regulation module 108 may regulate network traffic, based on the adding of the fourth priority factor to the configuration of the quality of service engine, such that the modified or improved quality of service engine effectively prevents the potential failure of the service level agreement and, instead, guarantees satisfaction of the service level agreement. Additionally, or alternatively, regulation module 108 may regulate network traffic by providing access to the network resource to every member of a set of higher priority applications (e.g., all of the applications categorized as higher priority at the quality of service engine) up to a threshold, respectively, and then provide access to the network resource to every member of a set of lower priority applications thereafter. In some examples, the threshold may correspond to the reservation value. In other examples, the threshold may correspond to the limit value.

Additionally, or alternatively, in some examples, after satisfying the threshold for each member of the set of higher priority applications (e.g., after providing each member access to the resource up to the reservation value), regulation module 108 may provide access to the network resource to remaining applications that are categorized as lower priority, in proportion to the respective weight value for these remaining applications. In other words, in one embodiment, regulation module 108 further provides, after satisfying a set of applications that were assigned the higher priority, access to a remainder of the network resource to applications that were assigned the lower priority according to the respective weight value. In further examples, regulation module 108 may provide access to the remainder of the network resource to applications that were assigned the lower priority according to a round robin algorithm. The round robin algorithm may provide a portion of the network resource, in proportion to the respective weight value for each application in the group of lower priority applications, to each respective application in a serial manner, such that the lower priority applications take turns accessing the network resource. The length of time of accessing the network resource may be proportional to the weight value, as discussed above.

The above discussion provides an overview of method 300 of FIG. 3. Additionally, the following discussion provides a more detailed overview of concrete embodiments of the disclosed systems and methods.

The disclosed systems and methods may address one or more of the following concerns: performance guarantee and service level agreement enforcement, intelligent use of network resources, ensuring fair distribution of network resource access, preventing and/or relieving network resource starvation, and/or work conservation. These concerns may arise in the context of a network storage environment where multiple workloads are generated by at least one hypervisor and/or operating system, which interface with multiple instances of network storage. A quality of service engine may be situated between the hypervisor and/or operating system, on the one hand, and the underlying instances of network storage, on the other hand. The quality of service engine may regulate network traffic and network resource access, at a higher level of abstraction or implementation than the network traffic itself according to a network model, by prioritizing one or more network packets over others and/or by regulating the control, sharing, reservation, and/or locking of network resources and their corresponding access. In other words, the quality of service engine may manipulate, modify, manage, revise, and/or rearrange one or more network packets and/or network commands in an effort to optimize network performance, adhere to a service level agreement, and/or improve the overall performance of the network storage environment.

In one example, the disclosed systems and methods may address the above-described concerns by applying or using a multi-dimensional quality of service engine or design. The quality of service engine may be multi-dimensional in the sense that it considers, as factors, not just one or more traditional factors, such as the reservation value, the limit value, and the weight value, but also considers, as a second dimension, the priority factor, as further described above. In other words, the priority field, which can take at least two values (e.g., higher priority and lower priority) establishes a second or additional axis along which the quality of service engine may measure, analyze, and/or regulate network traffic. In some examples, the quality of service engine may assign a higher priority to mission-critical applications. Moreover, by assigning the higher priority to mission-critical applications, the quality of service engine can newly achieve a guarantee of performance and/or adherence to the service level agreement.

After guaranteeing performance to the mission-critical applications, as discussed above, the quality of service engine may then distribute access to a remainder of one or more network resources to the mission non-critical applications. The quality of service engine may distribute this access in a manner that is weighted (e.g., according to the respective weight factor for each application) and/or round-robin, as further discussed above. In some examples, the quality of service engine may distribute access to one or more network resources by first providing access up to the reservation value for each of these remaining applications, and then distribute a remainder of access to the one or more resources in proportion to their respective application weight value.

In view of the above, the improved quality of service engine may establish two tiers of network traffic, which may correspond to a higher priority network traffic queue and a lower priority network traffic queue. The higher priority network traffic queue may correspond to mission-critical applications, as further described above. The lower priority network traffic queue may correspond to network replication operations that replicate data, which was originated by mission-critical applications, between one or more remote servers, hosts, and/or nodes (e.g., at a data center as shown in FIG. 4). Notably, without establishing the priority factor and corresponding axis, the quality of service engine would be unable to guarantee adherence to the service level agreement under over-subscribed and/or overloaded conditions. More specifically, all applications would share the network resource (e.g., shared network storage) on an equal priority basis. This would impact the performance of mission critical applications as more low priority applications are added to the system. In contrast, improving the quality of service engine by adding the priority factor and corresponding axis may enable the quality of service engine to guarantee adherence to the service level agreement.

In one specific example, in the VERITAS HYPERSCALE software architecture, there is a software module named the "quality of service engine." The quality of service engine uses features such as "weight" (i.e., the weight value), "min" (i.e., the reservation value), and "max" (i.e., the limit value) to control the access by applications to storage systems. The disclosed systems and methods may incorporate the additional "priority" feature to the quality of service engine software module. Applications with a higher priority are allowed, by the quality of service engine, to access the storage systems first.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing quality of service, at least a portion of the method being performed by a computing device comprising at least one processor, the method comprising:
   providing, in a network storage environment, a quality of service engine to regulate network traffic by assigning three separate factors to applications that are consuming a network resource:
      a reservation value;
      a limit value; and
      a weight value;
   adding, to a configuration of the quality of service engine, a fourth priority factor that establishes two tiers of priority among applications that generate traffic that is regulated by the quality of service engine; and
   regulating, by the quality of service engine based on the fourth priority factor, network traffic in the network storage environment by providing access to the network resource to an application assigned a higher priority over another application assigned a lower priority such that the fourth priority factor enables the quality of service engine to adhere to a service level agreement, wherein:
   the quality of service engine is situated between a hypervisor and network storage;
   the lower priority designates replication traffic for replicating data; and
   the replication traffic was originally generated by applications that are assigned the higher priority.

2. The computer-implemented method of claim 1, wherein the two tiers of priority comprise:
   a higher priority queue of north-south local user application traffic; and
   a lower priority queue of east-west inter-server data center network traffic as distinct from the local user application traffic.

3. The computer-implemented method of claim 1, wherein the two tiers of priority comprise
   a higher priority queue for applications that are categorized as mission critical in terms of the service level agreement.

4. The computer-implemented method of claim 1, wherein the two tiers of priority comprise a lower priority queue for applications that are categorized as mission non-critical in terms of the service level agreement.

5. The computer-implemented method of claim 1, wherein the network resource corresponds to at least one of:
   storage in the network storage environment;
   central processing unit utilization; and
   input/output operations per second.

6. The computer-implemented method of claim 1, wherein the weight value is defined in terms of an integer and a relative proportion of the network resource provided to the application, after satisfying the reservation value, is defined in terms of the integer divided by a totality of weight values that include the weight value and at least one other weight value.

7. The computer-implemented method of claim 1, wherein:
   the reservation value reserves an amount of the network resource for the application;
   the limit value limits usage of the network resource by the application to the limit value; and
   the weight value defines a relative proportion of the network resource that will be provided to the application in comparison to a competing application after satisfying the reservation value.

8. The computer-implemented method of claim 1, wherein:
   the three separate factors of the reservation value, the limit value, and the weight value, prior to adding the fourth priority factor, ensure an equitable sharing of the network resource but create a potential failure to adhere to the service level agreement; and
   the adding of the fourth priority factor to the configuration of the quality of service engine effectively prevents the potential failure and guarantees satisfaction of the service level agreement.

9. The computer-implemented method of claim 1, further comprising providing, after satisfying a set of applications that were assigned the higher priority, access to a remainder of the network resource to applications that were assigned the lower priority according to the respective weight value.

10. The computer-implemented method of claim 9, wherein access is provided to the remainder of the network resource to applications that were assigned the lower priority according to a round robin algorithm.

11. A system for managing quality of service, the system comprising:
   a provisioning module, stored in memory, that provides, in a network storage environment, a quality of service engine to regulate network traffic by assigning three separate factors to applications that are consuming a network resource:
      a reservation value;
      a limit value; and
      a weight value;
   an adding module, stored in memory, that adds, to a configuration of the quality of service engine, a fourth priority factor that establishes two tiers of priority among applications that generate traffic that is regulated by the quality of service engine;
   a regulation module, stored in memory, that regulates, as part of the quality of service engine and based on the fourth priority factor, network traffic in the network storage environment by providing access to the network resource to an application assigned a higher priority over another application assigned a lower priority such that the fourth priority factor enables the quality of service engine to adhere to a service level agreement; and
   at least one physical processor configured to execute the provisioning module, the adding module, and the regulation module, wherein:
   the quality of service engine is situated between a hypervisor and network storage;
   the lower priority designates replication traffic for replicating data; and
   the replication traffic was originally generated by applications that are assigned the higher priority.

12. The system of claim 11, wherein the two tiers of priority comprise:
   a higher priority queue of north-south local user application traffic; and
   a lower priority queue of east-west inter-server data center network traffic as distinct from the local user application traffic.

13. The computer-implemented method of claim 1, wherein the two tiers of priority
   comprise a higher priority queue for applications that are categorized as mission critical in terms of the service level agreement.

14. The system of claim 11, wherein the two tiers of priority comprise a lower priority queue for applications that are categorized as mission non-critical in terms of the service level agreement.

15. The system of claim 11, wherein the network resource corresponds to at least one of:
   storage in the network storage environment;
   central processing unit utilization; and
   input/output operations per second.

16. The system of claim 11, wherein the weight value is defined in terms of an integer and a relative proportion of the network resource provided to the application, after satisfying the reservation value, is defined in terms of the integer divided by a totality of weight values that include the weight value and at least one other weight value.

17. The system of claim 11, wherein:
   the reservation value reserves an amount of the network resource for the application;
   the limit value limits usage of the network resource by the application to the limit value; and
   the weight value defines a relative proportion of the network resource that will be provided to the application in comparison to a competing application after satisfying the reservation value.

18. The system of claim 11, wherein:
   the three separate factors of the reservation value, the limit value, and the weight value, prior to adding the fourth priority factor, ensure an equitable sharing of the network resource but create a potential failure to adhere to the service level agreement; and
   the adding module adding the fourth priority factor to the configuration of the quality of service engine effectively prevents the potential failure and guarantees satisfaction of the service level agreement.

19. The system of claim 11, wherein the regulation module provides, after satisfying a set of applications that were assigned the higher priority, access to a remainder of the network resource to applications that were assigned the lower priority according to the respective weight value.

20. A non-transitory computer-readable medium comprising one or more computer-readable instructions that, when executed by at least one processor of a computing device, cause the computing device to:

provide, in a network storage environment, a quality of service engine to regulate network traffic by assigning three separate factors to applications that are consuming a network resource:
   a reservation value;
   a limit value; and
   a weight value;
add, to a configuration of the quality of service engine, a fourth priority factor that establishes two tiers of priority among applications that generate traffic that is regulated by the quality of service engine; and
regulate, by the quality of service engine based on the fourth priority factor, network traffic in the network storage environment by providing access to the network resource to an application assigned a higher priority over another application assigned a lower priority such that the fourth priority factor enables the quality of service engine to adhere to a service level agreement, wherein:
the quality of service engine is situated between a hypervisor and network storage;
the lower priority designates replication traffic for replicating data; and
the replication traffic was originally generated by applications that are assigned the higher priority.

* * * * *